US006856818B1

(12) United States Patent
Ford

(10) Patent No.: US 6,856,818 B1
(45) Date of Patent: Feb. 15, 2005

(54) DATA STORE FOR MOBILE RADIO STATION

(75) Inventor: Peter Ford, Bristol (GB)

(73) Assignee: Orange Personal Communications Services Ltd., Bristol (GB)

( * ) Notice: Subject to any disclaimer, the term of this patent is extended or adjusted under 35 U.S.C. 154(b) by 0 days.

(21) Appl. No.: 09/367,390

(22) PCT Filed: Jan. 19, 1998

(86) PCT No.: PCT/GB98/00153
§ 371 (c)(1),
(2), (4) Date: Dec. 6, 1999

(87) PCT Pub. No.: WO98/35516
PCT Pub. Date: Aug. 13, 1998

(30) Foreign Application Priority Data

Feb. 11, 1997 (GB) .............................................. 9702789

(51) Int. Cl.$^7$ ............................................... H04M 1/00
(52) U.S. Cl. ...................................... 455/575; 455/558
(58) Field of Search .............................. 455/558, 418, 455/419, 575, 420, 550.1, 186.1, 186.2; 235/485, 486, 487, 476

(56) References Cited

U.S. PATENT DOCUMENTS

| 6,011,976 | A | * | 1/2000 | Michaels et al. | 455/466 |
| 6,223,026 | B1 | * | 4/2001 | Martschitsch | 455/407 |
| 6,223,052 | B1 | * | 4/2001 | Ali Vehmas et al. | 455/551 |
| 6,223,059 | B1 | * | 4/2001 | Heastrup | 455/566 |
| 6,256,497 | B1 | * | 7/2001 | Chambers | 455/433 |
| 6,278,885 | B1 | * | 8/2001 | Hubbe et al. | 455/558 |
| 6,367,014 | B1 | * | 4/2002 | Proust et al. | 713/182 |

FOREIGN PATENT DOCUMENTS

| EP | 0 526 981 B1 | 2/1993 |
| EP | 0 681 408 A1 | 11/1995 |
| EP | 0 681 408 | 11/1995 |
| EP | 0 733 992 | 9/1996 |
| EP | 0 733 992 A2 | 9/1996 |
| FR | 2 611 289 | 8/1988 |
| WO | WO 92/19078 | 10/1992 |
| WO | WO 96/04759 | 2/1996 |

OTHER PUBLICATIONS

Sato, et al., *A High–Security Microcomputer for Telecommunication Systems*, Hitachi Review, vol. 42, No. 3, Jun., 1993, pp. 135–140.

* cited by examiner

Primary Examiner—Lester G. Kincaid
Assistant Examiner—Naghmeh Mehrpour
(74) Attorney, Agent, or Firm—Knobbe Martens Olson & Bear LLP

(57) ABSTRACT

A removable data store (34) for a mobile station (8) used in a mobile communications system, the data store being provided with two alternative fixed dialling number lists (70, 72) which are accessible by the mobile station. The data store itself determines a mode of operation of the mobile station, for example a telephone line mode, in order to select between accessing the first list or the second list. This allows the alternate list feature to be implemented without requiring the mobile station (8) to be modified for compatibility with the removable data store (34).

36 Claims, 5 Drawing Sheets

DATA STORE FOR MOBILE RADIO STATION

FIELD OF THE INVENTION

This invention relates to a removable data store for a user interface device, such as a mobile station used in a mobile communications system. One such data store is a subscriber identity module (SIM) as used in a GSM (Global System for Mobile communications) digital cellular radio system.

BACKGROUND OF THE INVENTION

In a known conventional GSM system, each mobile station, such as a mobile telephone handset, is provided with a SIM, also referred to as a smart card, which is inserted into the mobile station in order to allow the mobile station to receive service in a GSM network.

The SIM includes a microprocessor, memory elements including a permanent memory (e.g. ROM), a non-volatile re-writable memory (e.g. EEPROM) and a volatile re-writable memory (e.g. RAM), and contacts for forming the data transfer interface between the SIM and the mobile station.

A set of SIM-based data records are defined in the GSM standard. These include permanent data records, such as that holding the international mobile subscriber identity (IMSI) whereby a mobile subscriber is recognised by a mobile communications network. Other data records are modifiable, either at the initiative of the mobile station, such as the data record holding the current location area information (LAI) for the mobile station, or at the initiative of the mobile subscriber, such as a set of fixed dialling number (FDN) records which are used to allow the subscriber to bar calling of, or restrict calling to, the dialling numbers stored in the set of FDN records.

The GSM standard also specifies a command set for use by a mobile station to access data record in the SIM and retrieve and write data items from and to the file. Each standard data record has a standard data record address which is specified in an access command for that data record sent by the mobile station. The SIM uses the data record address in order to determine which data record is to be accessed. Thus, there is a linear relationship between a data record access command sent by the mobile station and the data record accessed by the SIM.

Thus, in theory any standard GSM mobile station is compatible with any standard GSM SIM which is connectable to the mobile station. Any basic GSM feature implemented on the mobile station which involves the storage and/or retrieval of the contents of a standard data record in the SIM is obtainable. Furthermore, by use of a standard such as the GSM standard, manufacturers are able to lower the cost of the technology involved, by pooling the cost of research and development. Production costs can also be minimised by a manufacturer by the use of basic designs which can be modified for the supply of equipment to different GSM network operators. Individual features for specific GSM operators can thus be provided on the equipment, whilst the basic GSM features are provided as a matter of course.

A subset of GSM mobile stations and SIMs are used in PCN (Personal Communication Network) Networks. PCN mobile stations and SIMs comply with the GSM/DCS 1800 standard. An added dual-line mode feature allows the mobile station to operate in two different line modes. A different dialling number (MSISDN) is associated with each mode, and stored in the SIM. The mobile station still retains only a single IMSI with which both MSISDNs are associated. The particular MSISDN for which a voice call is made is signalled on the network/mobile station radio interface by means of a bearer service code. For outgoing calls the signalled bearer service code is logged by the network in order to make an appropriate record of the call, e.g. for billing purposes, against the appropriate MSISDN. For incoming calls, the mobile station notes the signalled bearer service code and retrieves the corresponding MSISDN from the SIM and displays the MSISDN, or an associated line identifier, to the user when indicating the receipt of an incoming call.

European patent publication number EP-A-0526981 describes a cellular radio telephone which has two or more directory numbers stored in a memory. In one mode of operation, all of the directory numbers are enabled for incoming calls. In another mode of operation, one of the directory numbers is disabled such that the telephone will not respond to an incoming call intended for that number. Other modes may be provided where other of the directory numbers are disabled. When an incoming call is received, a microprocessor of the telephone compares the telephone number for which the incoming call is intended with each of its stored numbers. Providing the stored number is enabled, the telephone call is signalled to the user and the call may be answered in the conventional way. The directory numbers are stored in the memory in a conventional way, that is to say the directory numbers are stored as a set of records, each one of which may be independently addressed by the microprocessor.

International patent publication number WO 92/19078 describes a GSM-type mobile telephone system in which a smart card is allocated two IMSIs which are selectively activated by the user. Two SIM circuits are located at different ends of the smart card and are selectively activated by inserting the smart card into the mobile station in one of two ways. Each of the SIM circuits is provided with a different IMSI. Once the smart card is inserted into the mobile station, the mobile station accesses a data record, such as the IMSI data record, in a conventional fashion, and the data presented to the mobile station can be altered by removal and reinsertion of the smart card in an inverted disposition. A similar effect could be achieved simply by providing two separate SIMs having different subscriber identities. The SIM is in effect two SIM circuits combined on a single smart card.

According to one aspect of the present invention there is provided a removable data store for a user interface device, said data store comprising a memory for storing data, which memory is accessible by access procedures controlled by memory access messages sent by said user interface device, said data store further comprising a processor circuit having a first response to a memory access message, and a second response, different to said first response, to said memory access message, wherein said processor circuit independently selects between said first response and said second response on the basis of a current operational condition of said user interface device.

In the conventional arrangements, when a feature is to be added to the user interface device, such as a user station for a mobile communications system, which involves the storage and/or retrieval of data from the removable data store, such as a SIM, both the user station and the SIM must be modified. A new type of data record must be defined on the SIM having a new data record address by which the user station can address the data record. The user station itself must be provided with a new data record access procedure, involving the use of the new data record address on the SIM, for accessing the new data record.

One advantage of the present invention is that it provides an alternative method of providing a new feature, in which different responses are given to a memory access message sent by a user station. Implementation of the new feature does not necessarily require modification of the user station itself. The new feature can be implemented on the SIM, or equivalent data store, and activated in response to determination by the SIM as to which mode of operational condition of the user station, or other user interface device, is current.

Furthermore, when a feature involving access to a new data record on the SIM is added according to the conventional method by the modification of the SIM and the user station, a loss of inter-compatibility of the SIM with other user stations is inevitable. The added feature cannot be obtained when the modified SIM is inserted into a different user station, which otherwise complies with the same standard. Thus, use of the added feature is restricted to a combination of user station having the added feature capability and a SIM also having the added feature capability.

Another advantage of the present invention is that inter-compatibility of a data store with any standard user interface device can be retained. The added feature can be implemented solely on the data store, and invisibly to the user interface device, by arranging that the removable data store can independently determine whether the user interface device is in one operational condition or another.

In the past, only one data record has been accessible on a removable data store, such as a SIM, in response to a data record access message sent by a user interface device, whichever operational condition the user interface device is in. In the present invention, the data store is able to respond by the retrieval of data from alternative memory portions, depending on the operational condition of the user interface device. Data records specific to one operational condition can be stored and/or retrieved selectively in accordance with the operational condition of the user interface device.

In one type of known SIM, a data record is allocated for the storage of data relating to the mode of operation of a mobile station. Namely, a line flag record is already provided in some PCN SIMs, in particular those of the present applicant, to provide a PCN mobile station with a non-volatile record of the previously operative line after the mobile station has been switched off. When a line mode is chosen by the user, the mobile station writes the appropriate data into the line flag record, located at a predetermined memory address, using a SIM record update procedure. Then, when the mobile station is switched off and subsequently switched on, the mobile station performs a line flag record read procedure to determine which line mode to enter when the mobile station is initialising its various modes of operation. Thus, the line flag record has in the past been read only to determine a previous line mode of the mobile station, in order to set the line mode. The current line mode is not read

SUMMARY OF THE INVENTION

In accordance with the present invention, the line flag record indicating the current line mode of the mobile station can be read by the SIM, or equivalent data records can be used by other removable data stores, in order to determine which response it should provide to a memory access command sent by the mobile station, or other user interface device.

The memory access command may be a write command in which case a memory portion to which data is written is selected by the data store in accordance with the current operational condition of the user interface device. Thus, data specific to one operational condition can be updated when in that mode of operation, without data specific to other modes of operation being altered.

According to a further aspect of the invention, there is provided a smart card comprising a plurality of memory portions which are selectively accessible by an access message sent by a read/write device, access selection between said memory portions being performed by said smart card in accordance with variable data stored on said smart card. Accordingly, selection between memory portions can be performed on the smart card without the need for a specific instruction from the read/write device to which it is connected.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
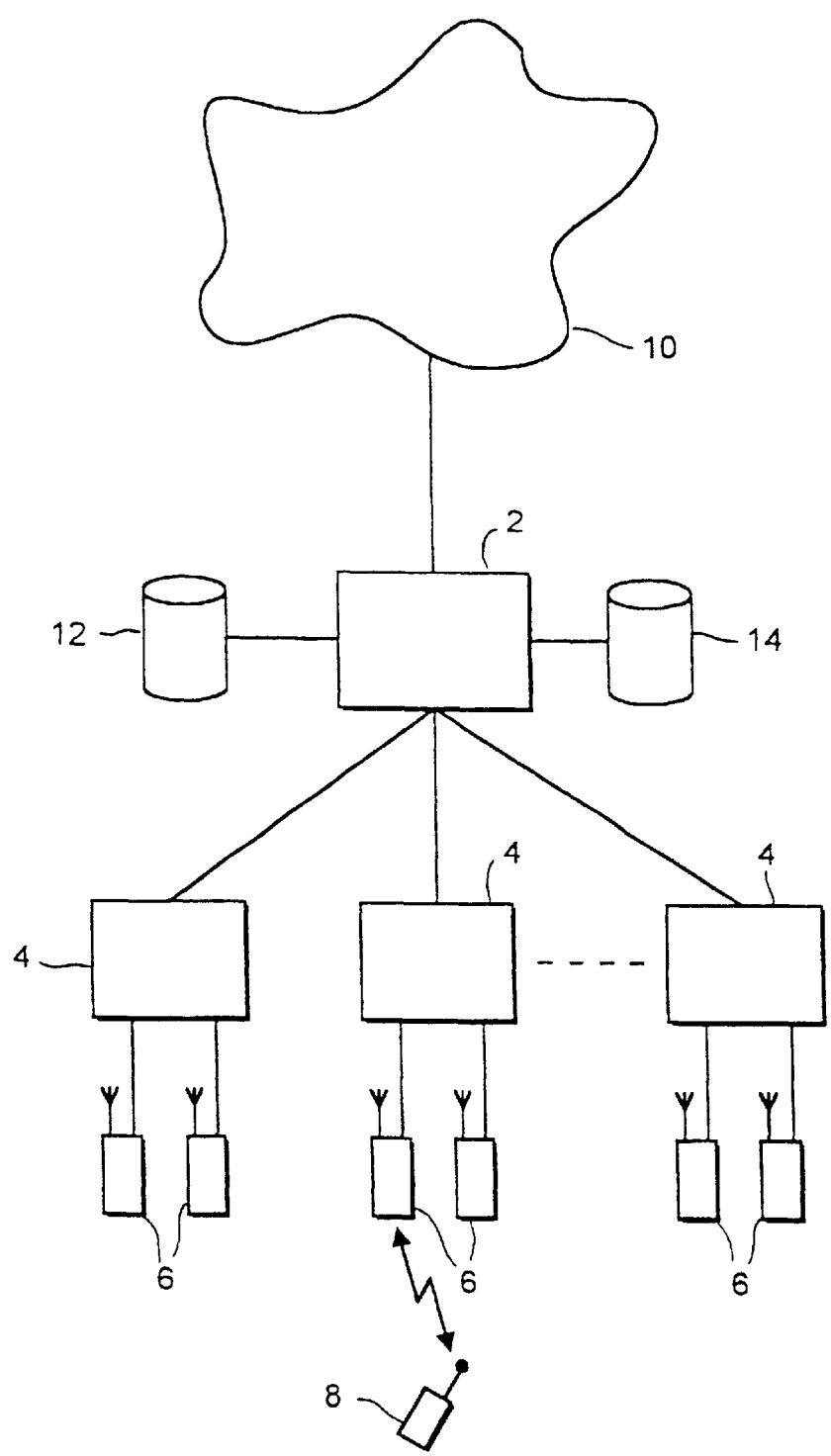
FIG. 1 is a block diagram of a mobile communications network.

A known PCN network, referred to as a public land mobile network (PLMN), is schematically illustrated in FIG. 1. This is in itself known and will not be described in detail. A mobile switching centre (MSC) 2 is connected via communication links to a number of base station controller (BSCs) 4. The BSCs 4 are dispersed geographically across areas served by the mobile switching centre 2. Each BSC controls one or more base transceiver stations (BTSs) 6 located remote from, and connected by further communication links to, the BSC. Each BTS 6 transmits radio signals to, and receives radio signals from, mobile stations 8 which are in an area served by that BTS. That area is referred to as a "cell". A PCN network is provided with a large number of such cells, which are ideally contiguous to provide continuous coverage over the whole network territory.

A mobile switching centre 2 is also connected via communications links to other mobile switching centres in the remainder of the mobile communications network 10, and to other networks such as a public service telephone network (PSTN), which is not illustrated. The mobile switching centre 2 is provided with a home location register (HLR) 12 which is a database storing subscriber authentication data including the international mobile subscriber identity (IMSI) which is unique to each mobile station 8. The IMSI is also stored in the mobile station in a subscriber identity module (SIM) along with other subscriber-specific information.

The mobile switching centre is also provided with a visitor location register (VLR) 14 which is a database temporarily storing subscriber authentication data for mobile stations active in its area.

Figure 2:
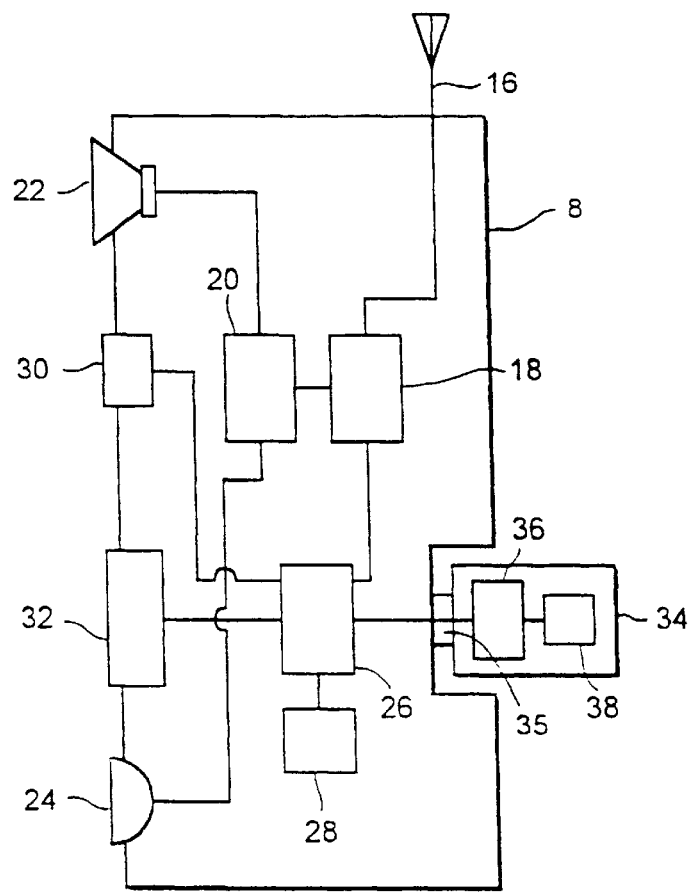
FIG. 2 is a block diagram of a mobile station.

Referring to FIG. 2, a PCN mobile station 8 comprises a transmit/receive aerial 16, a radio frequency transceiver 18, a speech coder/decoder 20 connected to a loudspeaker 22 and a microphone 24, a processor circuit 26 and its associated memory 28, an LCD display 30 and a manual input port (keypad) 32. The mobile station is connected to a removable PCN SIM 34 via electrical contacts 35.

The SIM 34 connected to the mobile station has a SIM processor 36, for example a Hitachi H8 microprocessor, and SIM memory 38, which includes for example 16 kilobytes of mask-programmed ROM containing the SIM operating system, 8 kilobytes of read/write EEPROM for the non-volatile storage of data items and 256 bytes of scratchpad RAM for use by the SIM processor during operations.

At present, two physical formats of SIM are specified by the GSM and ISO standards. The first is referred to as an ID-1 SIM, which is a smart card complying with the ISO 7816 standard and being of similar dimensions to that of a conventional credit card. The second is referred to as a plug-in SIM, which is a smart card of the same thickness as the ID-1 SIM, but only measuring 25 millimetres in length and 15 millimetres in width.

Both the mobile station 8 and the different types of SIM 34 are well known and therefore need not be described in detail herein. A commercially-available SIM is the GemXplore (registered trade mark) SIM card produced by Gemplus, BP 100-13881, Gemenos CedexFrance.

As described above, the SIM 34 is used for the storage and retrieval of data items by the processor 26 of the mobile station 8. The command set, data file structure and data coding format for data communicated via the interface between the mobile station processor 26 and the SIM processor 36 are all specified, in GSM technical specification 11.11, which is incorporated herein by reference.

Figure 3:
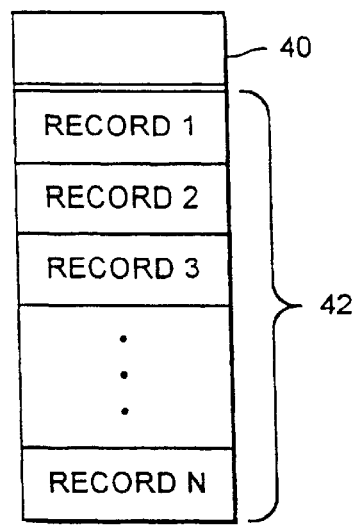
FIG. 3 illustrates the structure of an FDN list file.
Figure 4:
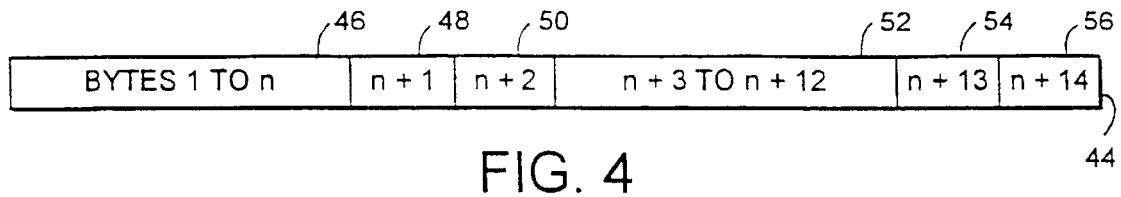
FIG. 4 illustrates the structure of an FDN data record.

A standard GSM file structure for the storage of data on a SIM, referred to as a linear fixed file structure, is illustrated in FIG. 3. It consists of a header 40 and record space 42. The record space is divided into N fixed length records.

One example of data record provided in the SIM memory 38 in a conventional SIM 34 is a fixed dialling number (FDN) record 44, which forms part of an FDN list file having a linear fixed file structure. Each FDN record 44 has data stored in a fixed length coding format. The record 44 is divided into fixed-length data blocks, each consisting of one or more bytes. A first data block 46, consisting of n bytes, is reserved for directory number identifier data. A second block 48, consisting of one byte, is reserved for data indicating the length of the directory number. A third block 50, consisting of one byte, is reserved for data indicating the type of dialling number stored in the record. A fourth block 52, consisting of 8 bytes of memory, is reserved for the directory number data itself. A fifth block 54, consisting of one byte, is reserved for a "capability configuration pointer", indicating the bearer services (e.g. voice call, fax, etc.) which can be supported by the telephone equipment corresponding to the directory number stored. A final data block 56, consisting of one byte, is an extension record pointer, which indicates the address of an extension record to be accessed in a different data file to give the remainder of an excessively lengthy number.

The FDN list has associated access conditions, namely in order for an FDN record to be read by the mobile station 8, a first user verification (herein referred to as PIN 1) needs to have been entered in order to enable the specified access to the FDN records. In addition, in order to update the FDN list, a second user verification (herein referred to as PIN 2) must have been entered by the mobile station user via keypad 32 in order to enable the FDN record to be updated. The use of two different user verifications allows an FDN list to be read at one level of access without allowing the FDN list to be updated at that level. This provides the security required for the FDN function, which restricts a user of the mobile telephone having knowledge only of the first user verification to make calls only to a defined set of directory numbers, or prevents calls to the defined set.

Figure 5:
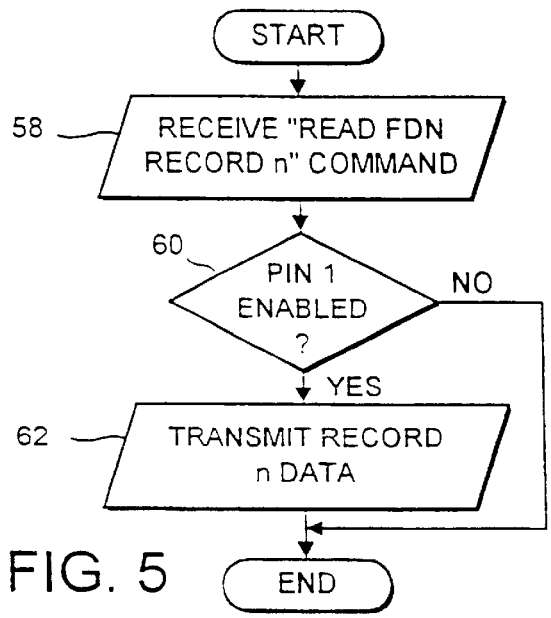
FIG. 5 is a flow diagram of steps taken by a conventional SIM when reading an FDN record.

Referring now to FIG. 5, when the mobile station 8 wishes to read the nth FDN record in the FDN list file, it sends a "read FDN record n" command to the SIM 34, which is received by the SIM processor 36 as shown in step 58.

In step 60, the SIM verifies that PIN 1 is enabled. If not, the SIM processor 36 provides no data in response to the read FDN record command. If PIN 1 is enabled, the mobile station reads the nth FDN record and transmits the FDN data to the mobile station in step 62.

Figure 6:
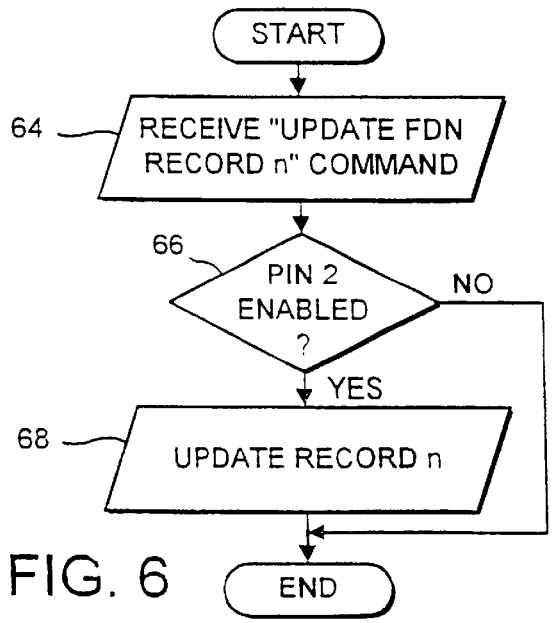
FIG. 6 is a flow diagram showing steps taken by a conventional SIM when updating an FDN data record.

Referring now to FIG. 6, when any request is received from the mobile station 8 to update the nth FDN record, as shown at step 64, the mobile station first checks whether PIN 2 is enabled, step 66. If not, the specified FDN record is not updated, step 68, and remains unchanged. If PIN 2 is enabled, the specified FDN record is updated with the new data items sent by the mobile station processor 26 accompanying the update FDN record command.

Figure 7:
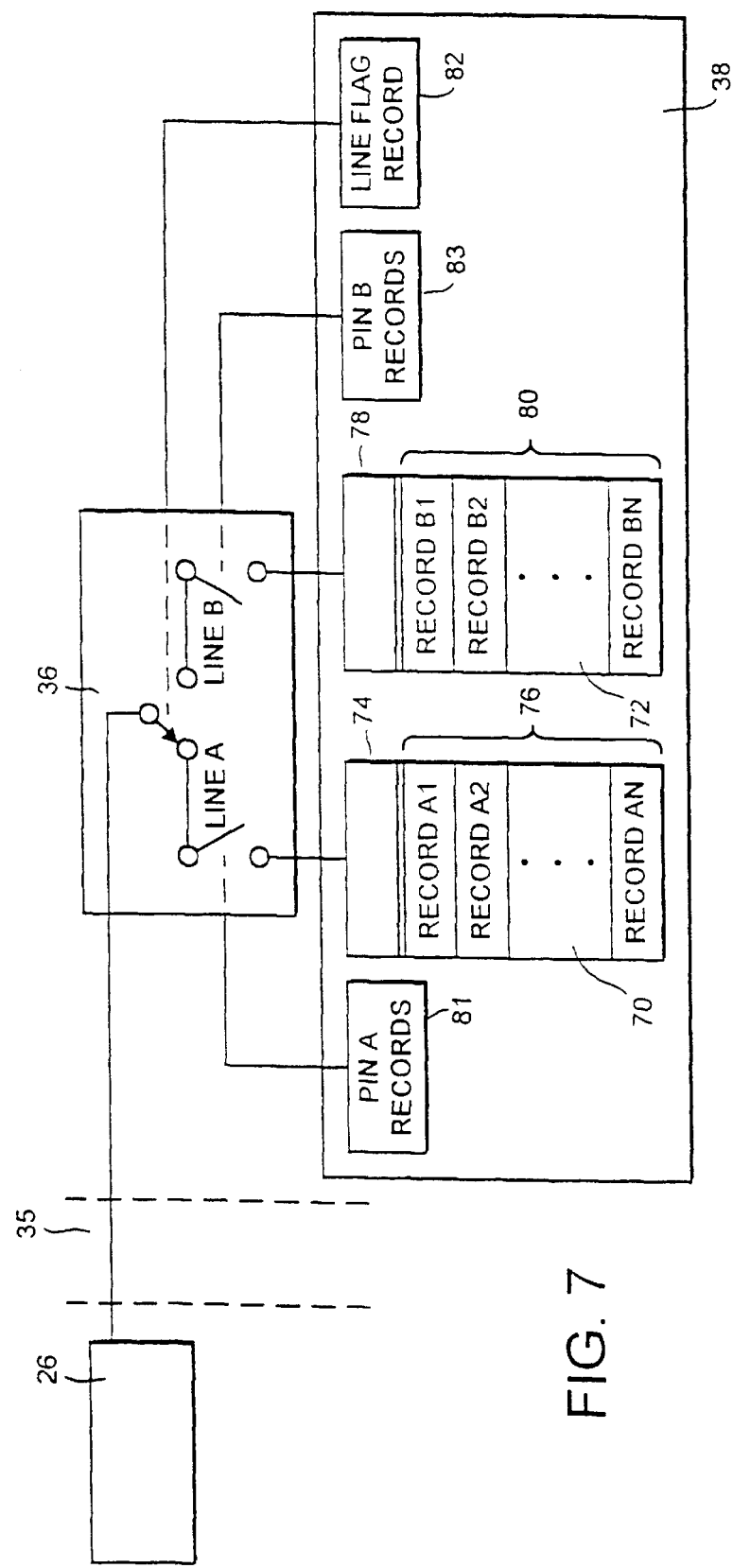
FIG. 7 is a block diagram illustrating a principle of the present invention.

The principle of this embodiment is illustrated in FIG. 7. The drawing is a schematic diagram showing the data flow path for FDN data communicated between the mobile station processor 26 and the SIM processor 36, across the interface 35. Two FDN data files 70 and 72, each of a format similar to that of a conventional FDN list file, are provided. A first FDN list file 70 is associated with a first voice call line, line A, of the mobile station 8. A second FDN file 72 is associated with a second voice call line, line B. FDN list file 70 contains a header portion 74 and a record portion 76 containing N records A1 to AN. The second FDN list file 72 also contains a header portion 78 and a record portion 80, containing N records B1 to BN.

The SIM memory also contains a line flag record 82, which contains data indicating a current line mode of the mobile station 8, and first and second PIN files 81 and 83 containing independent user verification data for each line mode.

In this embodiment of the present invention, the line flag record 82 is utilised by the SIM processor 36 in order to determine which of the FDN list files 70 or 72 to select when an FDN record access command is sent by the mobile station processor 26. The FDN record access command sent by the mobile station processor 26 is of a conventional GSM standard type, containing the unique GSM-specified FDN file address. However, in the present invention there are two FDN list files 70 and 72 each having a different file address when addressed by the SIM processor 36. Each of the two addresses used by the SIM processor 36 when addressing the FDN lists files 70 and 72 corresponds with the one file address sent by the mobile station processor 26 in the file access command across mobile stations/SIM interface 35.

This file access command is received by the SIM processor 36, which decides which of the FDN list files 70 or 72 to address on the basis contents of the line flag record 82. Thus, the FDN list file selection is performed independently of the mobile station 8 and no modification of the FDN record access command sent by the mobile station is required in order to implement the presentation of alternative FDN list files associated with alternative line modes of the mobile station 8.

Figure 8:
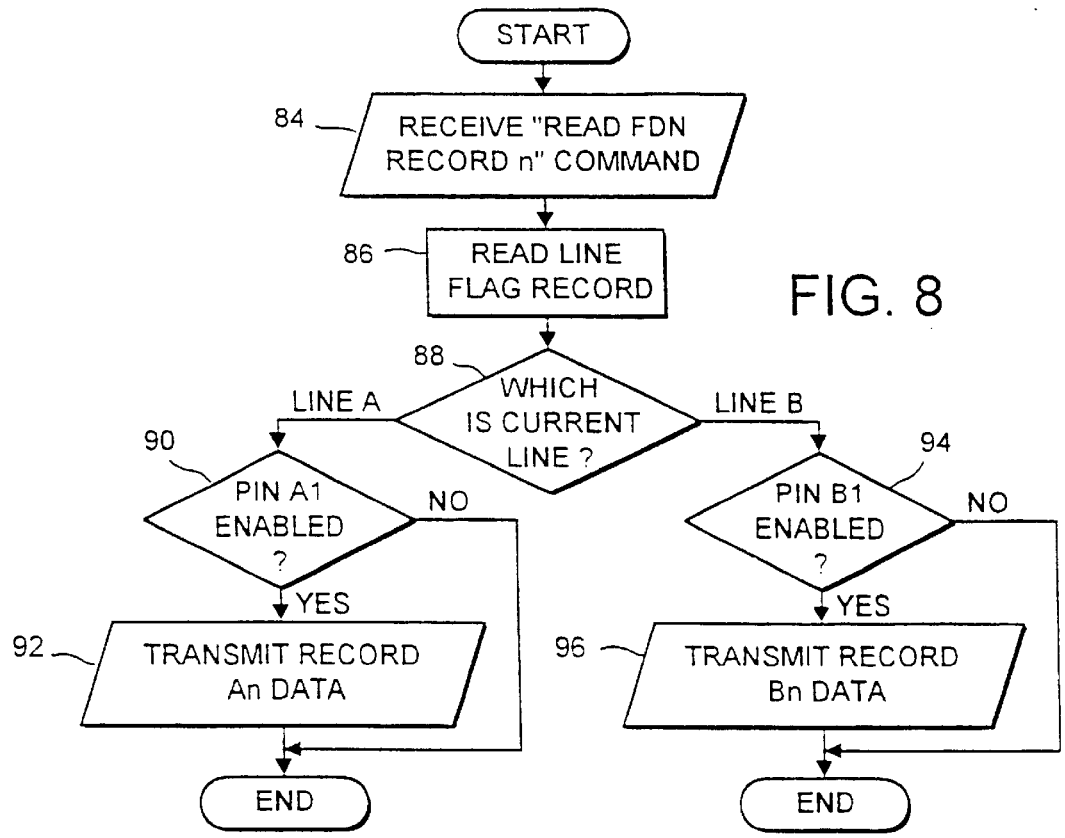
FIG. 8 is a flow diagram showing steps taken by a SIM according to the present invention when reading an FDN record.

Referring to FIG. 8, when the SIM receives a command to read one of its FDN records, at step 84, it first reads the line flag record 82 in step 86. From that, it determines which line mode is currently operative in the mobile station 8, in step 88. If line A is operative, the mobile station verifies that a first user verification (PIN A1) associated with line A and stored in PIN A record file 81 has been entered correctly (i.e. enabled) by the mobile station user in response to a user verification prompt, in step 90.

If PIN A1 has not be enabled, no response will be sent to the mobile station 8. If however PIN A1 has been enabled, the SIM microprocessor 36 accesses FDN list file 70 and transmits the FDN record of the specified number, in this case FDN record An, to the mobile station processor 26 in step 92. If on the other hand line B is found to be current on step 88, the SIM microprocessor 36 determines whether a different user verification PIN B1 stored in PIN 3 record file 83, has been enabled by an appropriate input by the mobile station user, in step 94. If not, no data is transmitted to the mobile station processor 26. If PIN B1 has been enabled, the SIM operating system selects FDN list file 72 and transmits the contents of the record, in this case FDN record Bn, corresponding to the FDN record specified in the FDN record access command, in step 96.

Figure 9:
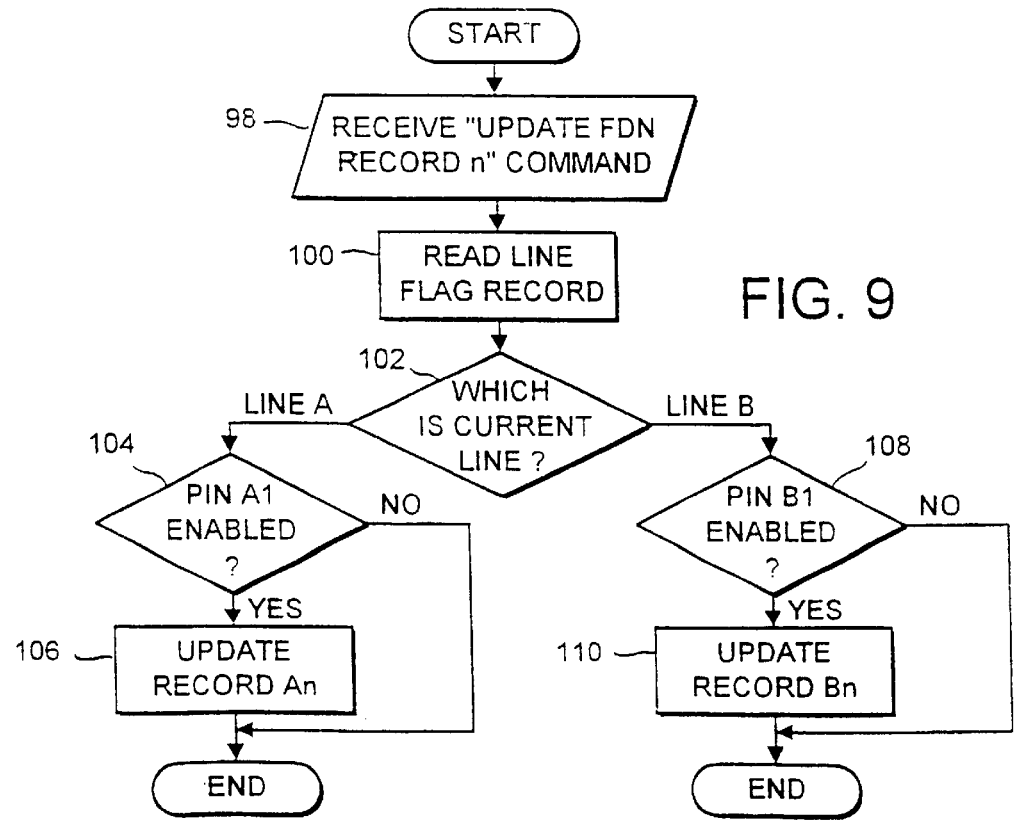
FIG. 9 is flow diagram showing steps taken by a SIM according to the present invention when updating an FDN record

Referring now to FIG. 9, only one of the list files 70 and 72 may be updated in response to an FDN record update command sent by mobile station processor 26, in dependence on the current line mode. When a user enters updated FDN data into mobile station 8, the mobile station processor 26 generates an appropriate update FDN record command. This relates to FDN record n seen by the mobile station processor 26.

When the SIM processor 36 receives the "update FDN record n" command in step 98, it first reads the line flag record 82, in step 100, to determine which is the current operative line in the mobile station 8.

If the mobile station processor 36 determines in step 102 that line A is current, it checks in step 104 whether a further user verification, PIN A2, stored in PIN A record file 81, has been enabled by the mobile station user. PIN A2 is different from PIN A1, to ensure that users of the telephone in line A mode cannot necessarily update the FDN list file 70. Thus, if PIN A2 is not enabled, the FDN list file 70 is not updated. If, however PIN A2 has been enabled in step 104, the appropriate FDN record, in this case FDN record An, corresponding to the FDN record specified by the mobile station processor 36, is updated with the new FDN record data.

If in step 102 the mobile station processor 36 determines that the mobile station is operating currently in line B mode, it verifies in step 108 whether a further user verification associated with line B, PIN B2, stored in PIN B record file 83 also different to PIN 1 for the reasons specified in relation to PIN A2, has been enabled. If PIN B2 has not been enabled, no update is performed. If PIN B2 has been enabled, the appropriate FDN record, in this case FDN record Bn corresponding to the FDN record specified in the update FDN record command, is updated with the new FDN record data.

Other Embodiments

The present invention is not limited to the particular types of data record stored on the SIM described above. Although in the above embodiment, the contents of the FDN list are altered in accordance with the current telephony mode, other types of data record could equally be altered in a similar fashion. For example, each standard GSM SIM is provided with a single abbreviated dialling number (ADN) list, which allows the mobile station user to store and quickly access frequently used telephone numbers on the SIM. Different such abbreviated dialling number lists could be presented in different line modes of the mobile station. These lists of records also need not be of the same length—the number of records in alternative lists could be different, in accordance with the record storage requirements of each respective mode of telephony of the mobile station.

Furthermore, the invention is not limited to different line modes. Other benefits may be obtained from the presentation of different alternative data depending on the current operational condition. For example, the operational condition may be a PIN mode, that is to say that one mode may be that in which a user has successfully enabled a PIN stored in the SIM, and a second mode of operation may be that in which the PIN has not been enabled. Thus, different data records, addressed by the same data record access command sent by the mobile station, could be presented by the SIM. This could be applied to the ADN list. In the PIN mode in which the relevant PIN has not been enabled, a non-secret ADN list could be presented. In the second PIN mode, a secret ADN list could be presented instead of, or in addition to, the non-secret ADN list. The selection of data records to be accessed could be implemented by the SIM processor 36 in a fashion similar to that described above.

It is also envisaged that the present invention could be applied in respect of a dual-mode mobile station which is operable both in an international mobile communications network and a national communications system. The ADN list stored in the SIM could be provided in two parts, namely one part containing the national directory numbers and a second part containing the international dialling codes of the stored dialling numbers. Furthermore, a mode flag record, similar to line mode record 82, could be provided in the SIM for the purposes of indicating whether the mobile station is currently in international network mode or national network mode. If in national network mode, the mobile station processor 36 would read only the national directory number data in response to an ADN record read request. However, in international network mode, the SIM processor 36 would access both the national directory number record and the international dialling code record corresponding to the ADN record read command received from the mobile station processor 26, and transmit the entire international directory number for use by the mobile station.

It is furthermore envisaged that the present invention is employable in relation to a customer service profile stored (CSP) in the SIM to identify the services available to the user. Not all networks support the entire range of services. Accordingly, in another embodiment of the present invention, when a mobile station requests a CSP from the SIM, the SIM would be adapted to read the mobile network code (MNC) in the location information record stored in the SIM. The SIM would also hold records of different available MNCs indicating which services are or are not available in the corresponding network. The response of the SIM to a CSP request would be modified accordingly. For example, if the user were to roam onto a network which does not support a short message service (SMS) function, the data provided by the SIM in response to a CSP request would suppress the SMS menu in the mobile station, although it would otherwise be available to the user in a different network.

The present invention is not restricted to selecting between two responses in accordance with an operational condition which is only one of two specified alternative operational conditions. Three or more such responses could be provided for a mobile station having three or more alternative specified operational conditions.

It is furthermore envisaged that the present invention could be implemented to provide a first response to a memory access message when a SIM is connected to one mobile station operating with a first operational condition, and a second response to the same memory access message received when connected to a different type of mobile station, having different operational conditions. The mobile station may for example send an identity code to the SIM when it is switched on, in order to signal its operating conditions to the SIM. The SIM would in turn store data relating to those operational conditions in a dedicated record, which could be accessed by the SIM in order to determine how to respond to a given memory access message.

It should be noted that the term "data record" as used herein need not be a record which can be separately addressed by the SIM processor 36. The present invention can be implemented by providing a "data record" in any form which contains of data which is separately identifiable by the SIM processor 36, and therefore separately processible by it.

The present invention is also not restricted to a removable data store for a mobile station. The invention could also be implemented in relation to any type of smart card, for example a smart card used in an electronic banking system.

Further variations and modifications to all or any of the above embodiments are envisaged which fall within the scope of the present invention.

What is claimed is:

1. A modified standard subscriber data storage module compatible with a mobile station used in a mobile communications system, the modified module comprising:

a processor for performing operations; and a memory having data records for storing data, which memory is accessible by the mobile station sending memory access messages to the modified module, the mobile station complying with a predetermined standard and being adapted, in accordance with the standard, to transmit a first memory access message, identifying a specific data record, in order to access the specific data record on a standard subscriber data storage module complying with the predetermined standard, the modified module being responsive to the first memory access message, identifying the specific data record, wherein the memory holds a plurality of data records corresponding to the specific data record and the processor is arranged to select one data record, from the plurality of data records, to access in response to the first memory access message, the selection being performed on the basis of data identifying a current operational condition of the mobile station and independently of the content of the first memory access message, the identifying data held in a further data record in the module.

2. The modified standard subscriber data storage module of claim 1, wherein the first memory access message is a data read command, and different data is transmitted to the mobile station depending on the data record selected from the plurality of data records.

3. The modified standard subscriber data storage module of claim 1, wherein the first memory access message is a data write command, and the processor writes data to the data record selected from the plurality of data records.

4. The modified standard subscriber data storage module of claim 3, wherein the mobile station is adapted, in accordance with the standard, to transmit a second memory access message, which is a data read command, identifying the specific data record, in order to read data from the specific data record on a standard subscriber data storage module complying with the predetermined standard, the modified module being responsive to the second memory access message, identifying the specific data record, and wherein the processor is arranged to select the one data record, from the plurality of data records, to read in response to the second memory access message, the selection being performed independently of the content of the second memory access message and on the basis of the identifying data.

5. The modified standard subscriber data storage module of claim 1, wherein, when the identifying data indicates a different current operational condition of the mobile station, the processor selects a different one of the plurality of data records to access in response to the first memory access message.

6. The modified standard subscriber data storage module of claim 1, wherein access to one of the plurality of data records is exclusive to one operational condition and access to another of the plurality of data records is exclusive to another operational condition.

7. The modified standard subscriber data storage module of claim 1, wherein storage of the identifying data is enabled by the input of a user verification code to the mobile station.

8. The modified standard subscriber data storage module of claim 7, wherein storage of the identifying data indicating a first current operational condition is enabled by a first such user verification code, and storage of the identifying code indicating a second operational condition is enabled by a second user verification code.

9. The modified standard subscriber data storage module of claim 1, wherein the processor is arranged to alter the identifying data in response to a separate data access message received from the mobile station, the separate data access message indicating a change of the operational condition.

10. The modified standard subscriber data storage module of claim 1, wherein the selective memory access comprises the reading or writing of data relating to a directory number.

11. The modified standard subscriber data storage module of claim 10, wherein the directory number data is used by the mobile station in order to determine a directory number for calling.

12. The modified standard subscriber data storage module of claim 1, wherein the operational condition is a module of telephony.

13. The modified standard subscriber data storage module of claim 12, wherein the modified module is compatible with a mobile station which is operable in two different telephone line modes, the selection being performed on the basis of which of the modes is operative.

14. The modified standard subscriber data storage module of claim 1, wherein the operational condition is a mode of operation of a radio interface between the mobile station and the mobile communications systems.

15. The modified standard subscriber data storage module of claim 1, wherein the system includes two different mobile communications networks and the modified module is compatible with a mobile station which is operable in two different network modes corresponding to the two different networks, the selection being performed on the basis of which of the network modes is operative.

16. The modified standard subscriber data storage module of claim 1, wherein the first memory access message identifies only a single data record, the single data record being the specific data record.

17. The modified standard subscriber data storage module of claim 1, wherein the first memory access message does not identify the further data storage portion.

18. A mobile station for use in a mobile communications system, the mobile station complying with a predetermined standard and being adapted, in accordance with the standard, to transmit a first memory access message, identifying a specific data record, in order to access the specific data record on a standard subscriber data storage module complying with the predetermined standard, the mobile station comprising:

a modified subscriber data storage module which includes a processor for performing operations and memory having data records for storing data, the modified module being responsive to the first memory access message, identifying the specific data record, wherein the memory holds a plurality of data records corresponding to the specific data record and the processor is arranged to select one data record, from the plurality of data records, to access in response to the first memory access message, the selection being performed on the basis of data identifying a current operational condition of the mobile station and independently of the content of the first memory access message, the identifying data being held in a further data record in the memory means.

19. The mobile station of claim 18, wherein the first memory access message is a data read command, and different data is transmitted to the mobile station depending on the data record selected from the plurality of data records.

20. The mobile station of claim 18, wherein the first memory access message is a data write command, and the processor writes data to the data record selected from the plurality of data records.

21. The mobile station of claim 20, wherein the mobile station is adapted, in accordance with the standard, to transmit a second memory access message, which is a data read command, identifying the specific data record, in order to read data from the specific data record on a standard subscriber data storage module complying with the predetermined standard, the modified module being responsive to the second memory access message, identifying the specific data record, and wherein the processor is arranged to select the one data record, from the plurality of data records, to read in response to the second memory access message, the selection being performed independently of the content of the second memory access message and on the basis of the identifying data.

22. The mobile station of claim 18, wherein, when the identifying data indicates a different current operational condition of the mobile station, the processor selects a different one of the plurality of data records to access in response to the first memory access message.

23. The mobile station of claim 18, wherein access to one of the plurality of data records is exclusive to one operational condition and access to another of the plurality of data records is exclusive to another operational condition.

24. The mobile station of claim 18, wherein storage of the identifying data is enabled by the input of a user verification code to the mobile station.

25. The mobile station of claim 24, wherein storage of the identifying data indicating a first current operational condition is enabled by a first such user verification code, and storage of the identifying data indicating a second operational condition is enabled by a second such user verification code.

26. The mobile station of claim 18, wherein the processor is arranged to alter the identifying data in response to a separate data access message received from the mobile station, the separate data access message indicating a change of the operational condition.

27. The mobile station of claim 18, wherein the selective memory access comprises the reading or writing of data relating to a directory number.

28. The mobile station of claim 27, wherein the directory number data is used by the mobile station in order to determine a directory number for calling.

29. The mobile station of claim 18, wherein the operational condition is a mode of telephony.

30. The mobile station of claim 29, wherein the modified module is compatible with a mobile station which is operable in two different telephone line modes, the selection being performed on the basis of which of the modes is operative.

31. The mobile station of claim 18, wherein the operational condition is a mode of operation of a radio interface between the mobile station and the mobile communication system.

32. The mobile station of claim 18, wherein the system includes two different mobile communications networks and the modified module is compatible with a mobile station which is operable in two different network modes corresponding to the two different networks, the selection being performed on the basis of which of the network modes is operative.

33. The mobile station of claim 18, wherein the first memory access message identifies only a single data record, the single data record being the specific data record.

34. The mobile station of claim 18, wherein the first memory access message does not identify the further data record.

35. A subscriber data storage module compatible with a mobile station used in a mobile communications system which includes two different mobile communications networks, the mobile station being operable in two different network modes corresponding to the two different networks, the module comprising:

a processor for performing operations; and a memory having data records for storing data, which memory means is accessible by the mobile station sending memory access messages to the module, wherein the memory holds a plurality of data records corresponding to a specific memory access message and the processor is configured to select one data record, from the plurality of data records, to access in response to the specific memory access message, the selection being performed on the basis of data identifying and operational condition of the mobile station and independently of the content of the first memory access message, the identifying data being held in further data record in the memory.

36. The subscriber data storage module of claim 35, wherein one of the network modes is a national network mode.

* * * * *